(12) United States Patent
Dailly et al.

(10) Patent No.: US 10,947,905 B1
(45) Date of Patent: Mar. 16, 2021

(54) SYSTEM AND PROCESS FOR PUMP ASSIST TO MAXIMIZE FUEL CONSUMPTION IN A NATURAL GAS POWERTRAIN

(71) Applicant: GM GLOBAL TECHNOLOGY OPERATIONS LLC, Detroit, MI (US)

(72) Inventors: Anne M. Dailly, West Bloomfield, MI (US); Richard H. Krentz, Bloomfield Hills, MI (US); Mei Cai, Bloomfield Hills, MI (US); Mahmoud Abd Elhamid, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/710,779

(22) Filed: Dec. 11, 2019

(51) Int. Cl.
*F02D 1/02* (2006.01)
*F02M 57/00* (2006.01)

(52) U.S. Cl.
CPC ............. *F02D 1/02* (2013.01); *F02M 57/005* (2013.01)

(58) Field of Classification Search
CPC .................................. F02D 1/02; F02M 57/005
See application file for complete search history.

(56) References Cited

U.S. PATENT DOCUMENTS

| | | | |
|---|---|---|---|
| 6,290,487 B1* | 9/2001 | Velke ...................... | F23D 23/00 431/11 |
| 2008/0034777 A1* | 2/2008 | Copeland .............. | F25B 47/006 62/323.1 |
| 2014/0020773 A1* | 1/2014 | Sommars ............... | F02M 43/04 137/511 |
| 2015/0300273 A1* | 10/2015 | Hunter ................... | G01N 21/85 701/103 |
| 2017/0045022 A1* | 2/2017 | Steffen .................... | F04B 17/05 |
| 2019/0085776 A1* | 3/2019 | Tate, Jr. ................ | F02D 19/081 |

* cited by examiner

*Primary Examiner* — Joseph J Dallo
(74) *Attorney, Agent, or Firm* — Quinn IP Law

(57) ABSTRACT

A system for pump assist to maximize fuel consumption in a natural gas powertrain includes a fuel delivery system including a natural gas storage tank supplying a first natural gas flow, a pressure sensor disposed to provide data regarding a natural gas pressure within the storage tank, and a natural gas pump operable to selectively boost the first natural gas flow to create a second natural gas flow with increased pressure. The system further includes an engine operable to utilize one of the natural gas flows to provide an output torque and including a fuel injector and a computerized fuel system controller programmed to monitor the data regarding the natural gas pressure within the storage tank, compare the data regarding the natural gas pressure within the storage tank to a threshold cut-off pressure for the fuel injector, and command activation of the natural gas pump based upon the comparing.

20 Claims, 3 Drawing Sheets

SYSTEM AND PROCESS FOR PUMP ASSIST TO MAXIMIZE FUEL CONSUMPTION IN A NATURAL GAS POWERTRAIN

INTRODUCTION

The disclosure generally relates to a system and process for pump assist to maximize fuel consumption in a natural gas powertrain.

Natural gas may be used to fuel a powertrain, for example, an internal combustion engine in a motor vehicle used upon a roadway. Natural gas is provided to one or more fuel injectors disposed upon an engine for selective injection into a combustion chamber where, when mixed with air, the natural gas creates a fuel air mixture useful for combustion. Fuel injectors are operable to cyclically inject a predefined amount or mass of natural gas based upon natural gas being supplied to the fuel injectors within a designed range of natural gas pressure. When the natural gas storage tank or tanks are full or near full, natural gas is available in abundance at a higher pressure than the designed range of natural gas pressure for the fuel injectors. A pressure regulator device is used to prevent natural gas from being delivered to the fuel injectors at too high of a pressure. As the natural gas storage tank or tanks begin to empty, the natural gas pressure drops until the natural gas pressure eventually goes below the designed range of natural gas pressure for the fuel injectors. Such a lower limit of the designed range of natural gas pressure for the fuel injectors may be described as a threshold cut-off pressure limit. When the natural gas pressure of the natural gas storage tank or tanks falls below the threshold cut-off pressure limit, the flow of natural gas to the fuel injectors is ceased, and other methods of providing energy to the powertrain may be employed, for example, through gasoline fuel, diesel fuel, or electrical energy, depending upon a configuration of the powertrain.

SUMMARY

A system for pump assist to maximize fuel consumption in a natural gas powertrain is provided. The system includes a fuel delivery system including a natural gas storage tank supplying a first natural gas flow, a pressure sensor disposed to provide data regarding a natural gas pressure within the natural gas storage tank, and a natural gas pump operable to selectively boost the first natural gas flow to create a second natural gas flow with increased pressure. The system further includes an engine operable to utilize one of the first natural gas flow and the second natural gas flow to provide an output torque and including a fuel injector and a computerized fuel system controller programmed to monitor the data regarding the natural gas pressure within the natural gas storage tank, compare the data regarding the natural gas pressure within the natural gas storage tank to a threshold cut-off pressure for the fuel injector, and command activation of the natural gas pump based upon the comparing.

In some embodiments, the computerized fuel system controller programmed to compare the data regarding the natural gas pressure within the natural gas storage tank to the threshold cut-off pressure for the fuel injector and command activation of the natural gas pump based upon the comparing includes the computerized fuel system controller being programmed to determine whether the natural gas pressure within the natural gas storage tank is below the threshold cut-off pressure for the fuel injector and command activation of the natural gas pump when the natural gas pressure within the natural gas storage tank is below the threshold cut-off pressure for the fuel injector.

In some embodiments, the engine includes a bi-fuel engine operable to combust natural gas and operable to combust a secondary fuel.

In some embodiments, the computerized fuel system controller programmed to compare the data regarding the natural gas pressure within the natural gas storage tank to the threshold cut-off pressure for the fuel injector and command activation of the natural gas pump based upon the comparing includes the computerized fuel system controller being programmed to determine a natural gas flow demand of the engine, determine whether the second natural gas flow is able to meet the natural gas flow demand of the engine, and provide the second natural gas flow to the engine based upon the second natural gas flow being able to meet the natural gas flow demand of the engine.

In some embodiments, the computerized fuel system controller programmed to provide the second natural gas flow to the engine based upon the second natural gas flow being able to meet the natural gas flow demand of the engine includes the computerized fuel system controller being programmed to, when the second natural gas flow is able to meet the natural gas flow demand of the engine, utilizing the second natural gas flow to power the engine.

In some embodiments, the computerized fuel system controller programmed to provide the second natural gas flow to the engine based upon the second natural gas flow being able to meet the natural gas flow demand of the engine includes the computerized fuel system controller being programmed to, when the second natural gas flow is unable to meet the natural gas flow demand of the engine, utilize the secondary fuel to power the engine.

In some embodiments, the computerized fuel system controller programmed to provide the second natural gas flow to the engine based upon the second natural gas flow being able to meet the natural gas flow demand of the engine includes the computerized fuel system controller being programmed to selectively utilize the second natural gas flow to power accessory devices.

In some embodiments, the natural gas pump is operable to permit natural gas to flow through the natural gas pump when the pump is deactivated.

In some embodiments, the fuel delivery system further includes a bypass valve operable to permit the first natural gas flow to bypass the natural gas pump when the natural gas pump is deactivated.

In some embodiments, the fuel delivery system further includes a pressure regulator between the natural gas pump and the natural gas storage tank.

In some embodiments, the fuel delivery system further includes a pressure regulator between the natural gas pump and the fuel injector.

According to one alternative embodiment, a system for pump assist to maximize fuel consumption in a natural gas powertrain is provided. The system includes a fuel delivery system including a natural gas storage tank supplying a first natural gas flow, a pressure sensor disposed to provide data regarding a natural gas pressure within the natural gas storage tank, and a natural gas pump operable to selectively boost the first natural gas flow to create a second natural gas flow with increased pressure. The system further includes a bi-fuel engine operable to utilize one of the first natural gas flow, the second natural gas flow, and a secondary fuel to provide an output torque and including a fuel injector and a computerized fuel system controller programmed to monitor the data regarding the natural gas pressure within the natural gas storage tank, determine whether the natural gas pressure within the natural gas storage tank is below a threshold cut-off pressure for the fuel injector, and command activation of the natural gas pump when the natural gas pressure within the natural gas storage tank is below the threshold cut-off pressure for the fuel injector.

In some embodiments, the computerized fuel system controller programmed to determine whether the natural gas pressure within the natural gas storage tank is below a threshold cut-off pressure for the fuel injector and command activation of the natural gas pump when the natural gas pressure within the natural gas storage tank is below the threshold cut-off pressure for the fuel injector includes the computerized fuel system controller being programmed to determine a natural gas flow demand of the bi-fuel engine, determine whether the second natural gas flow is able to meet the natural gas flow demand of the engine, and provide the second natural gas flow to the engine based upon the second natural gas flow being able to meet the natural gas flow demand of the engine.

In some embodiments, the computerized fuel system controller programmed to provide the second natural gas flow to the engine based upon the second natural gas flow being able to meet the natural gas flow demand of the engine includes the computerized fuel system controller being programmed to, when the second natural gas flow is able to meet the natural gas flow demand of the engine, utilize the second natural gas flow to power the engine.

In some embodiments, the computerized fuel system controller programmed to provide the second natural gas flow to the engine based upon the second natural gas flow being able to meet the natural gas flow demand of the engine includes the computerized fuel system controller being programmed to, when the second natural gas flow is unable to meet the natural gas flow demand of the engine, utilize the secondary fuel to power the engine.

In some embodiments, the computerized fuel system controller programmed to provide the second natural gas flow to the engine based upon the second natural gas flow being able to meet the natural gas flow demand of the engine includes the computerized fuel system controller being programmed to selectively utilize the second natural gas flow to power accessory devices.

According to one alternative embodiment, a process for pump assist to maximize fuel consumption in a natural gas powertrain is provided. The process includes, within a computerized fuel system controller, operating programming to monitor data regarding a natural gas pressure within a natural gas storage tank, determine whether the natural gas pressure within the natural gas storage tank is below a threshold cut-off pressure for a fuel injector of an engine operable to utilize natural gas to provide an output torque, and command activation of a natural gas pump to provide the pump assist operable to boost a pressure of the natural gas provided to the fuel injector when the natural gas pressure within the natural gas storage tank is below the threshold cut-off pressure for the fuel injector.

In some embodiments, the process further includes, within the computerized fuel system controller, further operating programming to determine a natural gas flow demand of the engine, determine whether the natural gas including the boosted pressure provided to the fuel injector is able to meet the natural gas flow demand of the engine, and provide the natural gas including the boosted pressure to the fuel injector based upon the natural gas including the boosted pressure being able to meet the natural gas flow demand of the engine.

In some embodiments, the process further includes, within the computerized fuel system controller, further operating programming to determine a natural gas flow demand of the engine, determine whether the natural gas including the boosted pressure provided to the fuel injector is able to meet the natural gas flow demand of the engine, and provide a secondary fuel to the fuel injector based upon the natural gas including the boosted pressure being unable to meet the natural gas flow demand of the engine.

In some embodiments, the process further includes, within the computerized fuel system controller, further operating programming to selectively utilize the natural gas to power accessory devices.

The above features and advantages and other features and advantages of the present disclosure are readily apparent from the following detailed description of the best modes for carrying out the disclosure when taken in connection with the accompanying drawings.

DETAILED DESCRIPTION

A natural gas powertrain system of a vehicle includes an engine configured to be fueled by a flow of natural gas. The natural gas powertrain system further includes a fuel delivery system. Maximum deliverable natural gas pressure within a fuel delivery system supplied by one or more natural gas storage tanks drops as natural gas is consumed. A mass of natural gas stored within the storage tanks affects the maximum deliverable natural gas pressure within the fuel delivery system. When maximum deliverable natural gas pressure is above or within the designed range of natural gas pressure for the fuel injectors of the associated engine, fuel is supplied to the injectors within the designed range of natural gas for the fuel injectors and the engine may operate normally. However, when a mass of natural gas within the natural gas storage tank or tanks gets too low, the maximum deliverable natural gas pressure for the fuel delivery system drops below a threshold cut-off pressure for the fuel injectors. Below the threshold cut-off pressure for the fuel injectors, the fuel injectors are no longer able to deliver enough natural gas to operate the engine at a wide-open-throttle condition or could hinder the engine from delivering a maximum output torque that could be demanded by a user. For this reason, the natural gas flow to the fuel injectors may be shut off when the maximum deliverable natural gas pressure for the fuel delivery system falls below the threshold cut-off pressure for the fuel injectors.

Such a shut-down of the natural gas flow may be disadvantageous. When the gas flow to the injectors is shut off, the natural gas storage tank or tanks are not empty. An operating range of vehicle is reduced by the fuel delivery system not being enabled to deliver an entirety of the natural gas stored in the system. Additionally, the natural gas remaining in the natural gas storage tank or tanks adds additional weight to the vehicle as compared to an empty storage tank or tanks, and therefore reduces an overall fuel efficiency of the vehicle.

A system and process for pump assist to maximize fuel consumption in a natural gas powertrain is provided. By utilizing a natural gas pump within a fuel delivery system of a natural gas powertrain, natural gas pressure within the fuel delivery system may be increased or boosted. By using a natural gas pump, the fuel delivery system may continue to deliver natural gas to the fuel injectors above the threshold cut-off pressure for a longer period or with a smaller mass of natural gas remaining in the natural gas storage tank or tanks as compared to a fuel delivery system without a pump.

Figure 1:
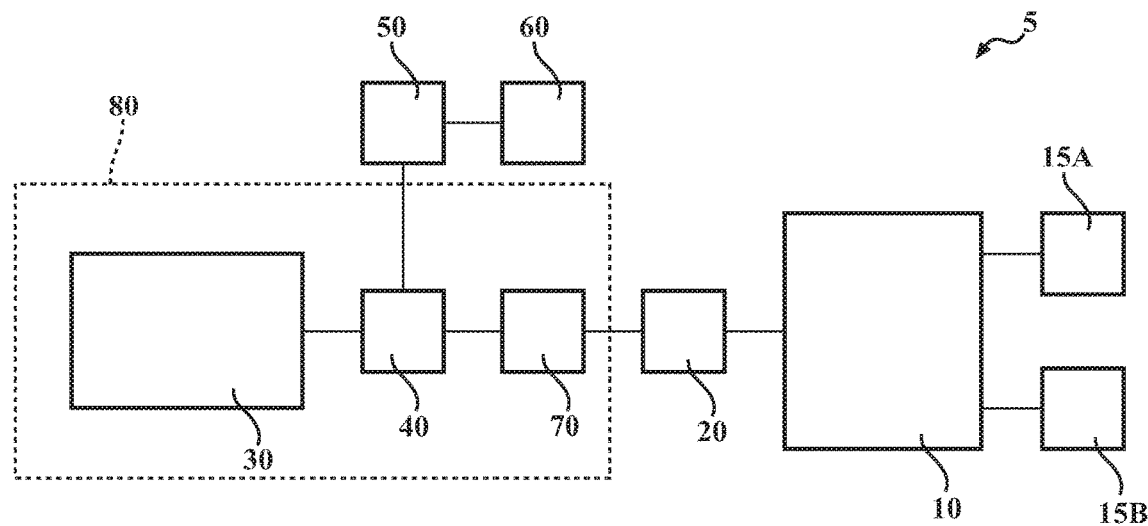
FIG. 1 schematically illustrates an embodiment of a natural gas powertrain including a fuel delivery system including a natural gas pump configured to selectively increase a maximum deliverable natural gas pressure of the fuel delivery system, in accordance with the present disclosure.

Referring now to the drawings, wherein like reference numbers refer to like features throughout the several views, FIG. 1 schematically illustrates an embodiment of a natural gas powertrain 5 including a fuel delivery system 80 including a natural gas pump 40 configured to selectively increase a maximum deliverable natural gas pressure of the fuel delivery system 80. Engine 10 is provided as an internal combustion engine configured to receive a natural gas through at least one fuel injector 20, combust the natural gas, and produce an output torque upon a driveshaft as a result of the combustion. Fuel delivery system 80 includes natural gas storage tank 30, natural gas pump 40, and pressure regulator 70. Natural gas storage tank 30 includes a mass of stored natural gas under pressure. When the natural gas storage tank 30 is in a filled state, the natural gas pressure within the tank exceeds a designed range of natural gas pressure for the fuel injector 20. When natural gas pump 40 is not in operation, a maximum deliverable natural gas pressure for fuel delivery system 80 is directly related to the natural gas pressure within natural gas storage tank 30, minus pressure losses incurred while the natural gas is flowing through the rest of fuel delivery system 80. By operating or activating natural gas pump 40, the maximum deliverable natural gas pressure may be increased above the natural gas pressure within natural gas storage tank 30. Activating or operating natural gas pump 40 to increase a maximum deliverable natural gas pressure within fuel delivery system 80 may be described as a pump assist process.

Pressure regulator 70 is provided within fuel delivery system 80. Pressure regulator 70 may include an internal mechanism including a diaphragm connected to a valve. Natural gas flowing from the natural gas storage tank 30 and/or from natural gas pump 40 is received by pressure regulator 70 through a gas inlet port, and pressure regulator 70 emits a flow of natural gas from a gas outlet port. The internal mechanism of pressure regulator 70 limits a maximum natural gas pressure of natural gas flowing out of the gas outlet port. Pressure regulator 70 is selected to produce a natural gas pressure at the gas outlet port equal to or within the designed range of natural gas pressure for the fuel injector 20. Pressure regulator 70 may limit or create a maximum natural gas pressure being emitted from the outlet port of pressure regulator 70, decreasing a natural gas pressure from a value at the inlet gas port higher than the designed range of natural gas pressure for the fuel injector 20 to a natural gas pressure at the outlet gas port of not more than the designed range of natural gas pressure for the fuel injector 20. Pressure regulator 70 may not increase a natural gas pressure above a natural gas pressure at the inlet gas port.

Natural gas pump 40 may be operable to permit natural gas to flow through the pump when the pump is unpowered. In another embodiment, a bypass valve may be used to permit natural gas to flow around natural gas pump 40 when the pump is unpowered.

A fuel system controller 60 is illustrated controlling a natural gas pump power source 50. Fuel system controller 60 is a computerized device which may include a processor, random access memory (RAM), durable memory operable to store data, and an analog-digital converter enabling fuel system controller 60 to communicate with a wide variety of computerized and electronic devices and sensors throughout the vehicle. Fuel system controller 60 is operable to execute programming which may include algorithms and executable instructions. Fuel system controller 60 provides commands to natural gas pump power source 50 to activate and deactivate the natural gas pump 40. A controller described herein may include a single physical electronic device, may include a portion of a larger multi-function physical electronic device, or may include functionality spanning several physical electronic devices.

Accessory devices 15A and 15B are illustrated connected to and/or receiving power from engine 10. Under some circumstances, for example, when a limited mass of natural gas remains within natural gas storage tank 30, fuel system controller 60 may command natural gas pump 40 and fuel delivery system 80 to deliver a natural gas flow to engine 10 under low engine demand circumstances, for example, powering accessory devices 15A and 15B while the vehicle is at a stop signal. Accessory devices may include an alternator supplying electrical power to the vehicle and an air conditioning compressor.

In some embodiments, engine 10 may be a bi-fuel engine, configured to operate either with a natural gas fuel or with a secondary fuel, such as gasoline fuel.

Figure 2:
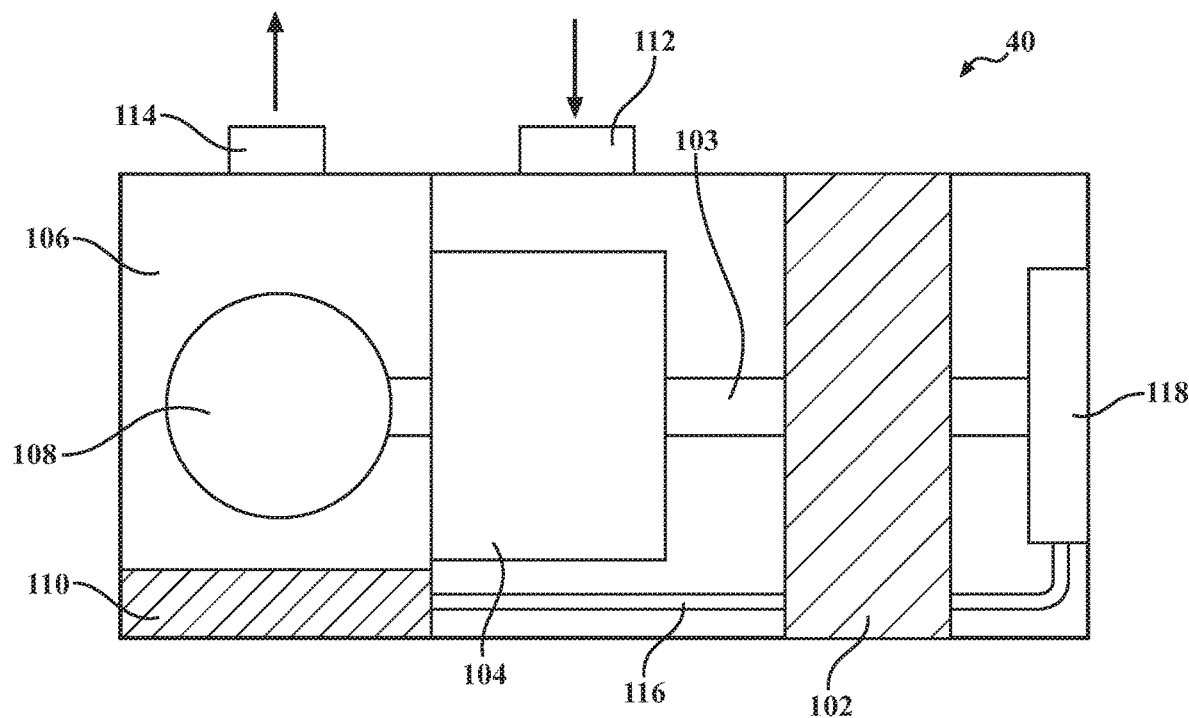
FIG. 2 schematically illustrates in cross sectional view the natural gas pump of FIG. 1, in accordance with the present disclosure.

FIG. 2 schematically illustrates in cross sectional view an embodiment of a natural gas pump 40. Natural gas pump 40 is illustrated including a motor 102 operable to receive electrical power from natural gas pump power source 50 of FIG. 1 and generate an output torque upon shaft 103. Shaft 103 turns scroll 104 which is operable to receive a natural gas flow from inlet 112 and, through the mechanical energy applied to scroll 104 through shaft 103, create a natural gas flow with increased pressure. The natural gas flow with increased pressure flows into chamber 106. The natural gas flow with increased pressure exits natural gas pump 40 from outlet 114.

Natural gas pump 40 is illustrated including oil sump 110 which contains a supply of lubricating oil. Natural gas pump 40 includes a sump pump mechanism 118 and a sump draw tube 116. Sump pump mechanism 118 is connected to and receives power from shaft 103. Lubricating oil is drawn from oil sump 110 through sump draw tube 116 by sump pump mechanism 118, and the lubricating oil is provided to the scroll 104 of natural gas pump 40 to reduce temperature and friction of scroll 104. Oil separator 108 is included within chamber 106 and aids in separating oil from the natural gas flow with increased pressure.

Figure 3:
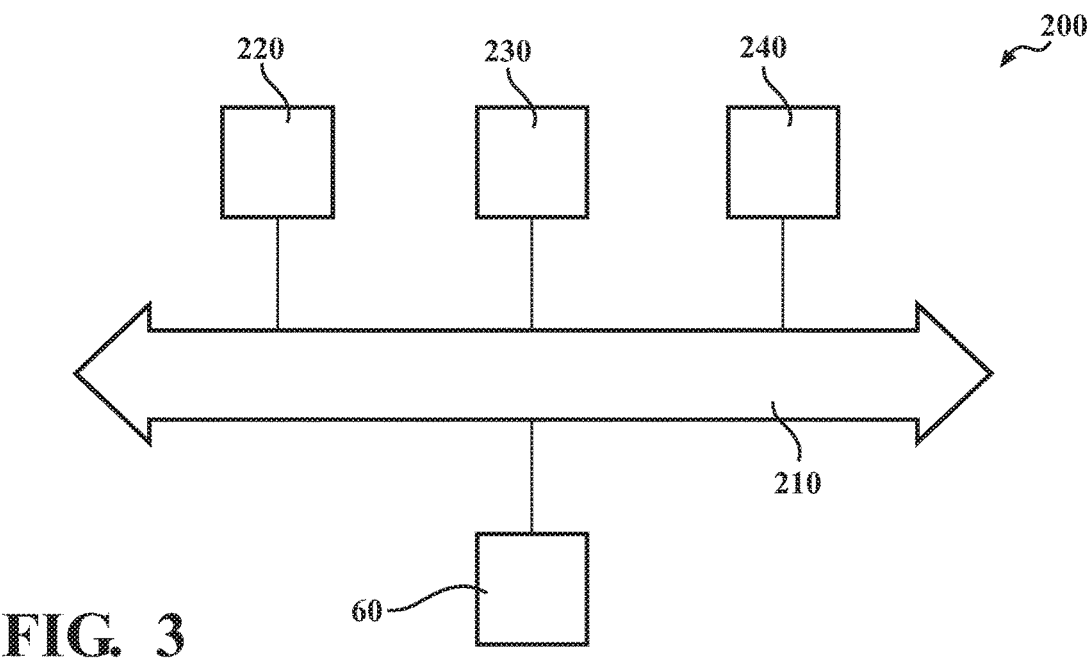
FIG. 3 schematically illustrates an embodiment of a vehicle control architecture, with devices and controllers communicating through a communication bus, in accordance with the present disclosure.

FIG. 3 schematically illustrates an embodiment of a vehicle control architecture 200, with devices and controllers communicating through a communication bus 210. Vehicle control architecture 200 is provided including fuel system controller 60, engine controller 220, natural gas storage tank pressure sensor 230, and accessory controller 240. Fuel system controller 60, engine controller 220, natural gas storage tank pressure sensor 230, and accessory controller 240 are electronically, signally connected through communication bus 210. Fuel system controller 60, engine controller 220, natural gas storage tank pressure sensor 230, and accessory controller 240 are examples of devices and controllers that may be connected through communication bus 210 and are not intended to be limiting examples. Fuel system controller 60 may communicate with engine controller 220, for example, to monitor a fuel demand level by engine 10. Fuel system controller 60 may additionally communicate with natural gas storage tank pressure sensor 230 in order to track a maximum deliverable natural gas pressure and determine when to activate the natural gas pump 40. Fuel system controller 60 may additionally communicate with accessory controller 240 to monitor needs of accessory devices 15A and 15B and activate natural gas pump 40 at appropriate times to deliver power through engine 10 to the accessory devices 15A and 15B.

Figure 4:
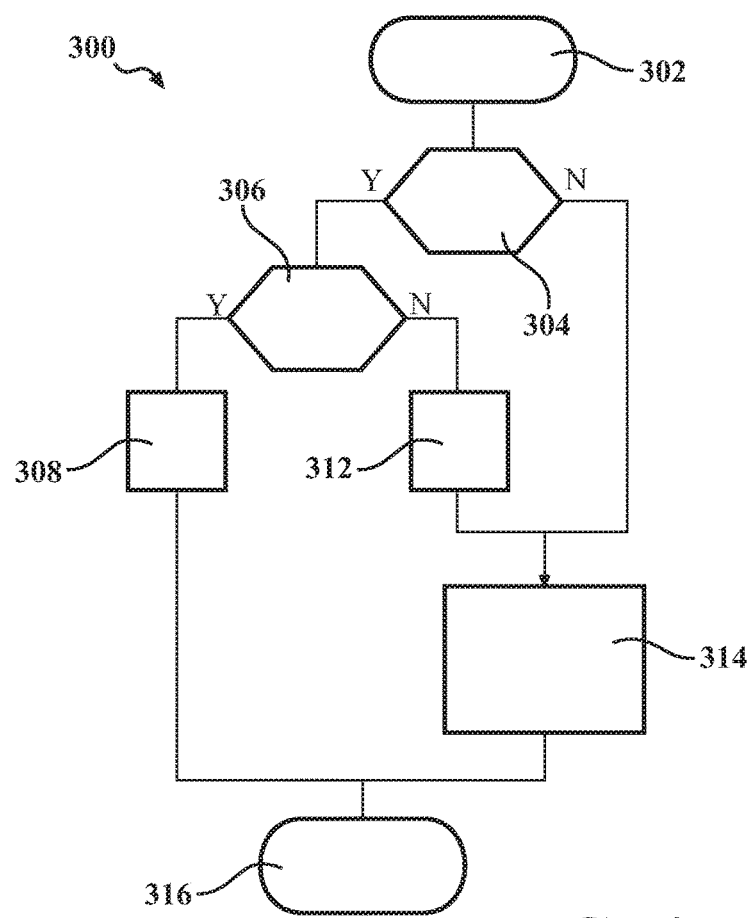
FIG. 4 illustrates an embodiment of a process for pump assist to maximize fuel consumption in a natural gas powertrain, in accordance with the present disclosure.

FIG. 4 illustrates an embodiment of a process for pump assist to maximize fuel consumption in a natural gas powertrain. Process 300 starts at step 302. At step 304, a determination is made whether the engine currently has a high demand for fuel. If the engine currently has a high demand for fuel, the process advances to step 306. If the engine does not currently have a high demand for fuel, the process advances to step 314. At step 306, a determination is made whether natural gas storage tank 30 includes enough natural gas pressure, with natural gas pump 40 creating a natural gas flow with increased pressure, to support the high demand for fuel by engine 10. If the natural gas storage tank 30 does include sufficient natural gas pressure, with the pump boost provided by the natural gas pump, to support high demand operation of engine 10, the process advances to step 308 where natural gas pump 40 is activated and engine 10 is operated with natural gas. If natural gas storage tank 30 does not include sufficient natural gas to support high demand operation of engine 10, the system advances to step 312, wherein engine 10 is operated with gasoline, and the process advances to step 314. At step 314, natural gas pump 40 is activated selectively, for example, during engine start events and at traffic stops to provide power to engine 10 to operate accessory devices 15A and/or 15B. Process 300 ends at step 316. Process 300 may be run iteratively, for example, with different determinations being made as engine fuel demand changes and as natural gas pressure in natural gas storage tank 30 changes. Process 300 is exemplary, a number of alternative process steps are envisioned, and the disclosure is not intended to be limited to the examples provided herein.

Figure 5:
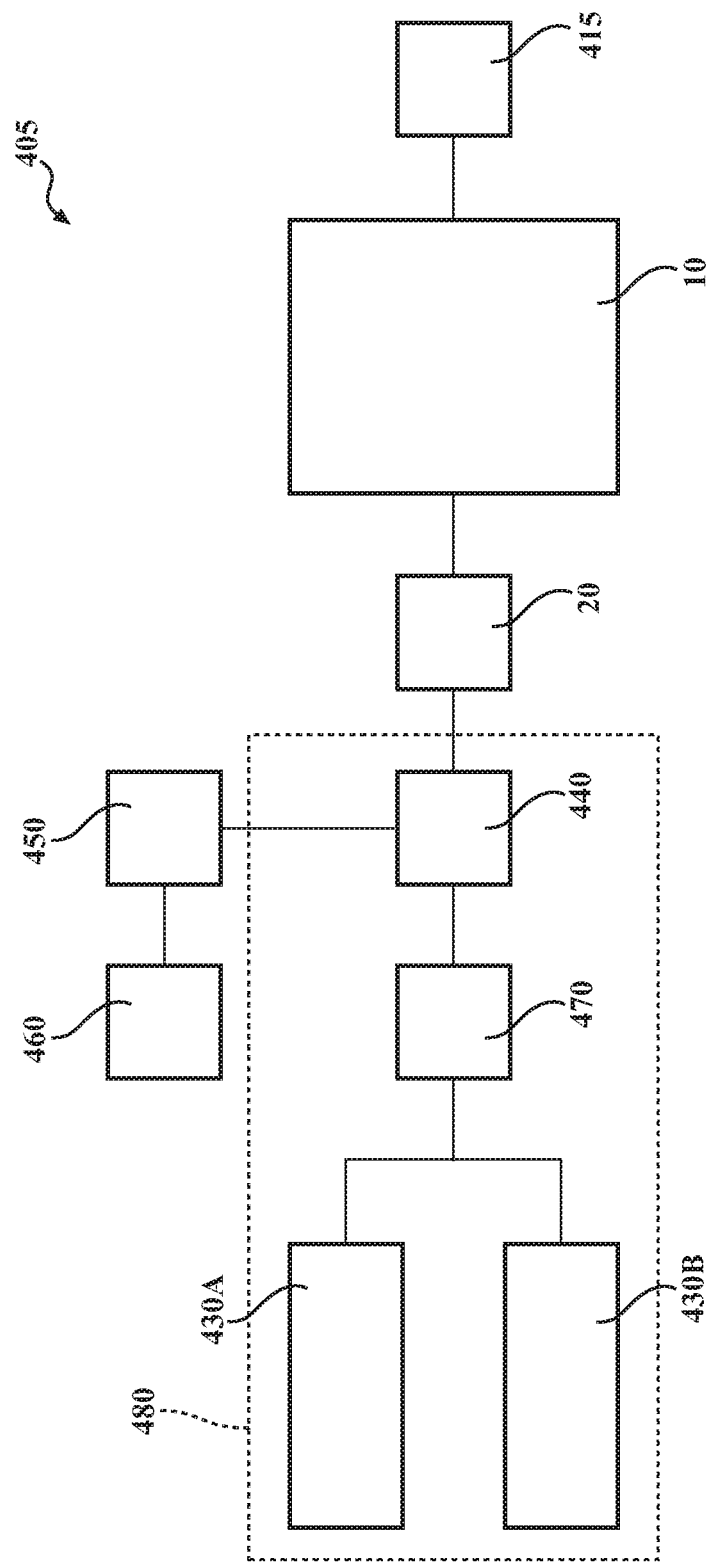
FIG. 5 schematically illustrates an additional embodiment of a natural gas powertrain including a natural gas pump and pressure regulator positioned between a natural gas pump and two natural gas storage tanks, in accordance with the present disclosure.

A pressure regulator may be positioned either between the natural gas pump and a natural gas storage tank or between the natural gas pump and the engine. FIG. 1 schematically illustrates an embodiment of a natural gas powertrain 5 including natural gas pump 40 and pressure regulator 70 positioned between natural gas pump 40 and engine 10. FIG. 5 schematically illustrates an additional embodiment of a natural gas powertrain 405 including a natural gas pump 440 and pressure regulator 470 positioned between natural gas pump 440 and a first natural gas storage tank 430A and a second natural gas storage tank 430 B. Natural gas storage tank 430A and natural gas storage tank 430B include a mass of stored natural gas under pressure. Natural gas storage tank 430A and natural gas storage tank 430B may be filled to different levels with different masses of natural gas stored there within, and small differences in natural gas pressure may exist between the tanks, for example, based upon pressure losses in fuel lines connecting the two tanks. For the purposes of the disclosure, a natural gas pressure within the tanks may be defined to include an average pressure within natural gas storage tank 430A and natural gas storage tank 430B. When natural gas storage tank 430A and natural gas storage tank 430B are in a filled state, the natural gas pressure within the tanks exceeds a designed range of natural gas pressure for the fuel injector 20. When natural gas pump 440 is not in operation, a maximum deliverable natural gas pressure for fuel delivery system 480 is directly related to the natural gas pressure within natural gas storage tank 430A and natural gas storage tank 430B, minus pressure losses incurred while the natural gas is flowing through the rest of fuel delivery system 480.

By operating or activating natural gas pump 440, the maximum deliverable natural gas pressure may be increased above the natural gas pressure within natural gas storage tank 430A and natural gas storage tank 430B. Activating or operating natural gas pump 440 to increase a maximum deliverable natural gas pressure within fuel delivery system 480 may be described as a pump assist process.

Natural gas pump 440 may be operable to permit natural gas to flow through the pump when the pump is unpowered. In another embodiment, a bypass valve may be used to permit natural gas to flow around natural gas pump 440 when the pump is unpowered.

A fuel system controller 460 is illustrated controlling a natural gas pump power source 450, which are similar to fuel system controller 60 and natural gas pump power source 50 of FIG. 1, respectively. Accessory devices 415 is illustrated connected to and/or receiving power from engine 10

While the best modes for carrying out the disclosure have been described in detail, those familiar with the art to which this disclosure relates will recognize various alternative designs and embodiments for practicing the disclosure within the scope of the appended claims.

What is claimed is:

1. A system for pump assist to maximize fuel consumption in a natural gas powertrain, comprising:
 a fuel delivery system including:
  a natural gas storage tank supplying a first natural gas flow;
  a pressure sensor disposed to provide data regarding a natural gas pressure within the natural gas storage tank; and
  a natural gas pump operable to selectively boost the first natural gas flow to create a second natural gas flow with increased pressure;
 an engine operable to utilize one of the first natural gas flow and the second natural gas flow to provide an output torque and including a fuel injector; and
 a computerized fuel system controller programmed to:
  monitor the data regarding the natural gas pressure within the natural gas storage tank;
  compare the data regarding the natural gas pressure within the natural gas storage tank to a threshold cut-off pressure for the fuel injector; and
  command activation of the natural gas pump based upon the comparing.

2. The system of claim 1, wherein the computerized fuel system controller programmed to compare the data regarding the natural gas pressure within the natural gas storage tank to the threshold cut-off pressure for the fuel injector and command the activation of the natural gas pump based upon the comparing includes the computerized fuel system controller being programmed to:
 determine whether the natural gas pressure within the natural gas storage tank is below the threshold cut-off pressure for the fuel injector; and
 command the activation of the natural gas pump when the natural gas pressure within the natural gas storage tank is below the threshold cut-off pressure for the fuel injector.

3. The system of claim 1, wherein the engine includes a bi-fuel engine operable to combust natural gas and operable to combust a secondary fuel.

4. The system of claim 3, wherein the computerized fuel system controller programmed to compare the data regarding the natural gas pressure within the natural gas storage tank to the threshold cut-off pressure for the fuel injector and command the activation of the natural gas pump based upon the comparing includes the computerized fuel system controller being programmed to:
 determine a natural gas flow demand of the engine;
 determine whether the second natural gas flow is able to meet the natural gas flow demand of the engine; and
 provide the second natural gas flow to the engine based upon the second natural gas flow being able to meet the natural gas flow demand of the engine.

5. The system of claim 4, wherein the computerized fuel system controller programmed to provide the second natural gas flow to the engine based upon the second natural gas flow being able to meet the natural gas flow demand of the engine includes the computerized fuel system controller being programmed to:
 when the second natural gas flow is able to meet the natural gas flow demand of the engine, utilize the second natural gas flow to power the engine.

6. The system of claim 4, wherein the computerized fuel system controller programmed to provide the second natural gas flow to the engine based upon the second natural gas flow being able to meet the natural gas flow demand of the engine includes the computerized fuel system controller being programmed to:
 when the second natural gas flow is unable to meet the natural gas flow demand of the engine, utilize the secondary fuel to power the engine.

7. The system of claim 6, wherein the computerized fuel system controller programmed to provide the second natural gas flow to the engine based upon the second natural gas flow being able to meet the natural gas flow demand of the engine includes the computerized fuel system controller being programmed to selectively utilize the second natural gas flow to power accessory devices.

8. The system of claim 1, wherein the natural gas pump is operable to permit natural gas to flow through the natural gas pump when the pump is deactivated.

9. The system of claim 1, wherein the fuel delivery system further includes a bypass valve operable to permit the first natural gas flow to bypass the natural gas pump when the natural gas pump is deactivated.

10. The system of claim 1, wherein the fuel delivery system further includes a pressure regulator between the natural gas pump and the natural gas storage tank.

11. The system of claim 1, wherein the fuel delivery system further includes a pressure regulator between the natural gas pump and the fuel injector.

12. A system for pump assist to maximize fuel consumption in a natural gas powertrain, comprising:
 a fuel delivery system including:
  a natural gas storage tank supplying a first natural gas flow;
  a pressure sensor disposed to provide data regarding a natural gas pressure within the natural gas storage tank; and
  a natural gas pump operable to selectively boost the first natural gas flow to create a second natural gas flow with increased pressure;
 a bi-fuel engine operable to utilize one of the first natural gas flow, the second natural gas flow, and a secondary fuel to provide an output torque and including a fuel injector; and
 a computerized fuel system controller programmed to:
  monitor the data regarding the natural gas pressure within the natural gas storage tank;
  determine whether the natural gas pressure within the natural gas storage tank is below a threshold cut-off pressure for the fuel injector; and
  command activation of the natural gas pump when the natural gas pressure within the natural gas storage tank is below the threshold cut-off pressure for the fuel injector.

13. The system of claim 12, wherein the computerized fuel system controller programmed to determine whether the natural gas pressure within the natural gas storage tank is below the threshold cut-off pressure for the fuel injector and command the activation of the natural gas pump when the natural gas pressure within the natural gas storage tank is below the threshold cut-off pressure for the fuel injector includes the computerized fuel system controller being programmed to:
 determine a natural gas flow demand of the bi-fuel engine;
 determine whether the second natural gas flow is able to meet the natural gas flow demand of the bi-fuel engine; and
 provide the second natural gas flow to the bi-fuel engine based upon the second natural gas flow being able to meet the natural gas flow demand of the bi-fuel engine.

14. The system of claim 13, wherein the computerized fuel system controller programmed to provide the second natural gas flow to the bi-fuel engine based upon the second natural gas flow being able to meet the natural gas flow demand of the bi-fuel engine includes the computerized fuel system controller being programmed to:
 when the second natural gas flow is able to meet the natural gas flow demand of the bi-fuel engine, utilize the second natural gas flow to power the bi-fuel engine.

15. The system of claim 13, wherein the computerized fuel system controller programmed to provide the second natural gas flow to the bi-fuel engine based upon the second natural gas flow being able to meet the natural gas flow demand of the bi-fuel engine includes the computerized fuel system controller being programmed to:
 when the second natural gas flow is unable to meet the natural gas flow demand of the bi-fuel engine, utilize the secondary fuel to power the bi-fuel engine.

16. The system of claim 15, wherein the computerized fuel system controller programmed to provide the second natural gas flow to the bi-fuel engine based upon the second natural gas flow being able to meet the natural gas flow demand of the bi-fuel engine includes the computerized fuel system controller being programmed to selectively utilize the second natural gas flow to power accessory devices.

17. A process for pump assist to maximize fuel consumption in a natural gas powertrain, comprising:
within a computerized fuel system controller, operating programming to:
monitor data regarding a natural gas pressure within a natural gas storage tank;
determine whether the natural gas pressure within the natural gas storage tank is below a threshold cut-off pressure for a fuel injector of an engine operable to utilize natural gas to provide an output torque; and
command activation of a natural gas pump to provide the pump assist operable to boost a pressure of the natural gas provided to the fuel injector when the natural gas pressure within the natural gas storage tank is below the threshold cut-off pressure for the fuel injector.

18. The process of claim 17, further comprising, within the computerized fuel system controller, further operating programming to:
determine a natural gas flow demand of the engine;
determine whether the natural gas including the boosted pressure provided to the fuel injector is able to meet the natural gas flow demand of the engine; and
provide the natural gas including the boosted pressure to the fuel injector based upon the natural gas including the boosted pressure being able to meet the natural gas flow demand of the engine.

19. The process of claim 17, further comprising, within the computerized fuel system controller, further operating programming to:
determine a natural gas flow demand of the engine;
determine whether the natural gas including the boosted pressure provided to the fuel injector is able to meet the natural gas flow demand of the engine; and
provide a secondary fuel to the fuel injector based upon the natural gas including the boosted pressure being unable to meet the natural gas flow demand of the engine.

20. The process of claim 19, further comprising, within the computerized fuel system controller, further operating programming to selectively utilize the natural gas to power accessory devices.

* * * * *